United States Patent
Malasky et al.

(10) Patent No.: US 8,191,060 B2
(45) Date of Patent: May 29, 2012

(54) SOFTWARE INSTALLATION USING TEMPLATE EXECUTABLES

(75) Inventors: Ethan Malasky, San Francisco, CA (US); Oliver Goldman, Redwood City, CA (US); Chris Brichford, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 255 days.

(21) Appl. No.: 11/512,763

(22) Filed: Aug. 29, 2006

(65) Prior Publication Data

US 2008/0127169 A1 May 29, 2008

(51) Int. Cl.
*G06F 9/445* (2006.01)
*G06F 9/44* (2006.01)
*G06F 9/46* (2006.01)
*G06F 3/048* (2006.01)

(52) U.S. Cl. ........ 717/175; 717/121; 717/170; 719/328; 715/763

(58) Field of Classification Search .................. None
See application file for complete search history.

(56) References Cited

U.S. PATENT DOCUMENTS

| | | | |
|---|---|---|---|
| 6,125,388 A | | 9/2000 | Reisman |
| 6,182,285 B1 * | | 1/2001 | Bleizeffer et al. ............ 717/170 |
| 6,557,054 B2 | | 4/2003 | Reisman |
| 6,687,745 B1 | | 2/2004 | Franco et al. |
| 6,687,902 B1 | | 2/2004 | Curtis et al. |
| 7,398,524 B2 * | | 7/2008 | Shapiro .......................... 717/175 |
| 7,458,062 B2 * | | 11/2008 | Coulthard et al. ............ 717/121 |
| 7,519,976 B2 * | | 4/2009 | Blevins ......................... 719/328 |
| 7,681,138 B2 * | | 3/2010 | Grasser et al. ................ 715/763 |
| 7,703,073 B2 * | | 4/2010 | Illowsky et al. .............. 717/121 |
| 7,797,678 B2 * | | 9/2010 | Moulckers et al. ........... 717/121 |
| 7,900,202 B2 * | | 3/2011 | Block et al. .................... 717/175 |
| 2001/0052121 A1 * | | 12/2001 | Masuda et al. .................. 717/11 |
| 2002/0010808 A1 * | | 1/2002 | Wiggins et al. .............. 709/328 |
| 2003/0018964 A1 * | | 1/2003 | Fox et al. ....................... 717/177 |
| 2003/0037328 A1 * | | 2/2003 | Cicciarelli et al. ........... 717/178 |
| 2003/0145317 A1 | | 7/2003 | Chamberlain |
| 2004/0088377 A1 * | | 5/2004 | Henriquez .................... 709/219 |
| 2004/0139430 A1 | | 7/2004 | Eatough et al. |
| 2004/0194082 A1 | | 9/2004 | Purkeypile et al. |
| 2005/0055688 A1 | | 3/2005 | Barajas et al. |
| 2005/0120094 A1 | | 6/2005 | Tuli |
| 2005/0155027 A1 | | 7/2005 | Wei |
| 2005/0188357 A1 | | 8/2005 | Derks et al. |
| 2006/0005207 A1 * | | 1/2006 | Louch et al. .................. 719/328 |
| 2006/0026592 A1 * | | 2/2006 | Simonen et al. .................. 718/1 |

(Continued)

OTHER PUBLICATIONS

"Model-driven framework for dynamic deployment and reconfiguration of component-based software systems", Ketfi et al., Nov. 2005, <http://delivery.acm.org/10.1145/1240000/1234332/a8-ketfi.pdf>.*

(Continued)

*Primary Examiner* — Thuy Dao
(74) *Attorney, Agent, or Firm* — Fish & Richardson P.C.

(57) ABSTRACT

This specification describes technologies relating to software installation. In general, a method of installing software can include obtaining application information for a software application to be installed on a target platform, the application information including an application name, an application icon, version information, and application code; obtaining a template executable including machine code native to the target platform; and adding the application information to the template executable to form an application executable for the software application.

27 Claims, 6 Drawing Sheets

U.S. PATENT DOCUMENTS

| | | | |
|---|---|---|---|
| 2008/0028390 | A1 | 7/2006 | Fors et al. |
| 2006/0225072 | A1* | 10/2006 | Lari et al. .................. 717/175 |
| 2006/0294515 | A1 | 12/2006 | Gimpi et al. |
| 2007/0038946 | A1 | 2/2007 | Grieshaber et al. |
| 2007/0067179 | A1 | 3/2007 | Kerr et al. |
| 2008/0109803 | A1* | 5/2008 | Fisher et al. ................ 717/175 |
| 2008/0127169 | A1 | 5/2008 | Malasky et al. |
| 2008/0127170 | A1 | 5/2008 | Goldman et al. |
| 2008/0134169 | A1* | 6/2008 | Williams et al. ............ 717/175 |
| 2011/0225575 | A1* | 9/2011 | Ningombam et al. ........ 717/170 |

OTHER PUBLICATIONS

"Delivering mobile enterprise applications on iMMS framework", Shen et al., May 2005, pp. 289-293, <http://delivery.acm.org/10.1145/1080000/1071293/p289-shen.pdf>.*

"Adobe Creative Suite 4 Enterprise Manual Deployment Guide", Adobe Systems Incorporated, 2008, <http://www.adobe.com/aboutadobe/openoptions/pdfs/manualenterprisedeployment_cs4_help.pdf>.*

T.H. Ng et al., Toward effective deployment of design patterns for software extension: a case study, May 2006, pp. 51-56, <http://delivery.acm.org/10.1145/1140000/1137713/p51-ng.pdf>.*

N. Paterson, MULTI: multiple user interactive template installation, Jun. 2007, p. 294, <http://delivery.acm.org/10.1145/1260000/1255030/p294-paterson.pdf>.*

Apple Computer, Inc. "Universal Binary Programming Guidelines, Second Edition", Jul. 24, 2006, retrieved from the internet at http://developer.apple.com/documentation/MacOSX/Conceptual/universal_binary/universal_binary.pdf, on Aug. 28, 2006, 96 pages.

Goldman, et al. "Software Installation and Support", U.S. Appl. No. 11/512,764 filed Aug. 29, 2006.

LaMonica, "Flash to Jump Beyond the Browser", May 11, 2006, retrieved from the internet at http://news.com.com/Flash+to+jump+beyond+the+browser/2100-1007_3-6071005.html, on Jul. 12, 2006, 6 pages.

Macromedia, Inc. "Publishing Flash Documents—Version 8", retrieved from the internet at http://livedocs.macromedia.com/flash/8/main/00000805.html, on Aug. 16, 2006, 2 pages.

Macrovision "InstallShield MultiPlatform 5 (incl. SP3)", Oct. 27, 2003, retrieved from the internet at http://www.installshield.com/downloads/imp/imp_readme53.asp, on Aug. 28, 2006, 10 pages.

Macrovision "InstallAnywhere 7.1 Users Guide", 2006, retrieved from the internet at http://www.macrovision.com/downloads/products/flexnet_installshield/installanywhere/documentation/ia71_user_guide.pdf, on Jul. 11, 2006, 121 pages.

Microsoft Corporation "Windows Installer XML (WiX) Toolset", 2005 retrieved from the internet at http://wix.sourceforge.net/manual-wix2/wix_index.htm, on Jul. 11, 2006, 392 pages.

Sun Microsystems, Inc. "Packaging Programs in JAR Files", retrieved from the internet at http://java.sun.com/docs/books/tutorial/deployment/jar/, on Jul. 20, 2006, 2 pages.

Swftools, "Flash Projector/Swftools.com", retrieved from the internet at http://www.swftools.com/tools-category.php?cat=290, on Aug. 16, 2006, 3 pages.

Sun Microsystems, Inc. "JAR File Specification", retrieved from the internet at http://java.sun.com/j2se/1.4.2/docs/guide/jar/jar.html, on Jan. 10, 2008, 14 pages.

Tuan Q. Dam, Authorized Officer, PCT/US07/77035, International Search Report and Written Opinion, mailed Jul. 24, 2008, 11 pages.

PCT Application PCT/US07/77029, International Search Report and Written Opinion, mailed on Sep. 22, 2008.

Cussac, Yolaine, Authorized Officer, PCT Application No. PCT/US2007/077029, International Preliminary Report on Patentability, mailed Mar. 12, 2009, 11 pages.

* cited by examiner

SOFTWARE INSTALLATION USING TEMPLATE EXECUTABLES

CROSS-REFERENCE TO RELATED APPLICATIONS

This application is related to U.S. patent application Ser. No. 11/512,764, entitled SOFTWARE INSTALLATION AND SUPPORT, to O. Goldman et al., filed on the same day as the present application.

BACKGROUND

The present disclosure relates to installing software on a computer platform. A computer platform is a computer including a particular operating system (OS) for that computer (e.g., WINDOWS® OS, MAC® OS, or LINUX® OS). Software developers often create source code that can be appropriately compiled for respective computer platforms, and then independently generate native installation packages for each target platform. Each native installation package is associated with a specific computer platform, and these native installation packages can then be distributed for installation on appropriate machines. For a particular target platform, the appropriate native installation package is obtained from the software developer, and an OS installer can be used to process the native installation package in order to install the application. For example, INSTALLSHIELD® software can be used to produce an .msi file for installation on WINDOWS® machines, and a different software tool can be used to produce .pkg files for installation on MAC® machines.

In order to facilitate this process of generating native installation packages for distribution, some software developers have used a common specification of the installer package for different platforms. This common specification can then be used to create each respective platform-specific installation package, where the common specification indicates information such as which source files and which compiler to use for different target platforms. In any event, the distributor of the desktop application distributes different installation packages for different target platforms, and the customer generally must ensure, when acquiring a software application, that they are purchasing the correct installation package for their system.

Other software developers have created cross-platform installation packages, such as the JAVA® Archive (JAR) file format, that get deployed to the end-user system. The cross-platform package can then be expanded (e.g., decrypted and uncompressed) and written directly to disk using code provided by the software developer and/or the developer of the cross-platform package format. Typically, such cross-platform software relies on a virtual machine, such as the JAVA® Virtual Machine (JVM) (available from Sun Microsystems, Inc.), to run on the target platform.

The JVM provides a runtime environment and Java interpreter for most operating systems, including WINDOWS® OS, MAC® OS, AND LINUX® OS. Java source code files (files with a .java extension) are compiled into a format called bytecode (files with a class extension), which can then be executed by a Java interpreter. Bytecode can be converted directly into machine language instructions by a just-in-time compiler (JIT).

Flash® Player (available from Adobe Systems Incorporated) is another virtual machine, which is used to run, or parse, Flash® files including ActionScript or Shockwave Flash (SWF). The Flash® Player and Flash® Authoring software allow development of projectors (self-running SWF movies) that run on a specific target platform, by embedding the SWF data in the Flash® Player executable to create a new .exe file, and manipulating a byte pattern in the .exe file to indicate the presence of the SWF data. Such projectors can then be distributed for use on the target platform.

SUMMARY

This specification describes technologies relating to software installation. In general, one aspect of the subject matter described in this specification can be embodied in a method of installing software that includes obtaining application information for a software application to be installed on a target platform, the application information including an application name, an application icon, version information, and application code; obtaining a template executable including machine code native to the target platform; and adding the application information to the template executable to form an application executable for the software application. Other embodiments of this aspect include corresponding systems, apparatus, and computer program products.

Obtaining the application information can include opening an installation package received from a software distributor, the installation package including package information stored in a platform independent format. Obtaining the application information can include receiving a data file used by the software application, the method further including checking whether a current version of the software application is installed on the target platform before obtaining the template executable and adding the application information to the template executable. Moreover, obtaining the template executable can include selecting the template executable from among multiple, previously obtained template executables for different platforms.

The adding can include using an application programming interface provided by an operating system of the target platform to update an icon resource in the template executable with the application icon and to update a version resource in the template executable with the version information. The adding can include transforming the application icon from a first format to a second format before updating the icon resource in the template executable with the application icon.

The method can further include placing the application executable into an install directory using a file name corresponding to the application name. The adding can include embedding the application code as a resource in the application executable, the application code including interpreted code that relies on a runtime library on the target platform to operate. The interpreted code can include bytecode that is compiled by the runtime library. Moreover, obtaining the application information can include opening an installation package received from a software distributor, the installation package including the runtime library, and the method further including determining if the runtime library is installed on the target platform; and installing the runtime library on the target platform if not already installed.

According to another aspect, the subject matter described in this specification can be embodied in a system including a user interface device; a computer platform including an operating system and a virtual machine, the virtual machine configured to create a virtualized environment between the computer platform and a software application programmed to operate on the virtual machine; and one or more computers operable to obtain application information for the software application to be installed on the computer platform, obtain a template executable including machine code native to the computer platform, and add the application information to the template executable to form an application executable on the computer platform; wherein the application information includes an application name, an application icon, version information, and application code.

The one or more computers can be operable to open an installation package received from a software distributor, the installation package including package information stored in a platform independent format. The one or more computers can be operable to receive a data file used by the software application and to check whether a current version of the software application is installed on the target platform before obtaining the template executable and adding the application information to the template executable. The one or more computers can be operable to select the template executable from among multiple, previously obtained template executables for different platforms.

The one or more computers can be operable to use an application programming interface provided by an operating system of the target platform to update an icon resource in the template executable with the application icon and to update a version resource in the template executable with the version information. The one or more computers can be operable to transform the application icon from a first format to a second format before updating the icon resource in the template executable with the application icon. The one or more computers can be operable to place the application executable into an install directory using a file name corresponding to the application name.

The one or more computers can be operable to embed the application code as a resource in the application executable, the application code including interpreted code that relies on a runtime library on the target platform to operate. The interpreted code can include bytecode that is compiled by the runtime library. The one or more computers can be operable to open an installation package received from a software distributor; the installation package including the runtime library; and the one or more computers can be operable to determine if the runtime library is installed on the target platform, and install the runtime library on the target platform if not already installed.

Particular embodiments of the subject matter described in this specification can be implemented to realize one or more of the following advantages. Software applications can be developed using a cross-platform code format, such as SWF, and such applications can then be installed on a computer platform and function within the OS user interface as a normal desktop application (e.g., with a separate, non-generic icon for program launch and a presence in OS utilities interfaces). The application can thus operate as a native application, allowing a developer to customize the application name and icon, such that when a task list is observed, an instance of the customized application executable is observed, rather than a generic instance of the runtime on which the applications depends.

The application executable can be built from template(s) included with the runtime. The runtime can include template executable files for multiple different computer platforms, and can include directions to install new applications by reading relevant data for an application to populate an appropriate template executable for a platform to make the executable operate as desired, and to place the new application executable into the appropriate install directory (with appropriate renaming based on the application's metadata) on the target platform. Thus, an application developer can program the application entirely in the cross-platform code format (e.g., SWF) and need not create multiple versions of the application's installation package for different computer platforms.

A software publisher need only create a single installation package that is suitable for all target platforms. The customer need only obtain a single installation package, and need not check whether the installation package matches their platform. By converting a cross-platform installation package into a native installation package, which can be installed using the native installer, the installation sequence can leverage all available native installation features. A cross-platform installation package can be converted into a platform-specific package on the fly in an installation engine. Thus, a single installation package can be used to distribute and install an application on multiple different computer platforms (e.g., both Windows® and Mac OS® systems), and a cross-platform application can be installed and function as a normal desktop application, even though dependent on a non-OS runtime environment.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
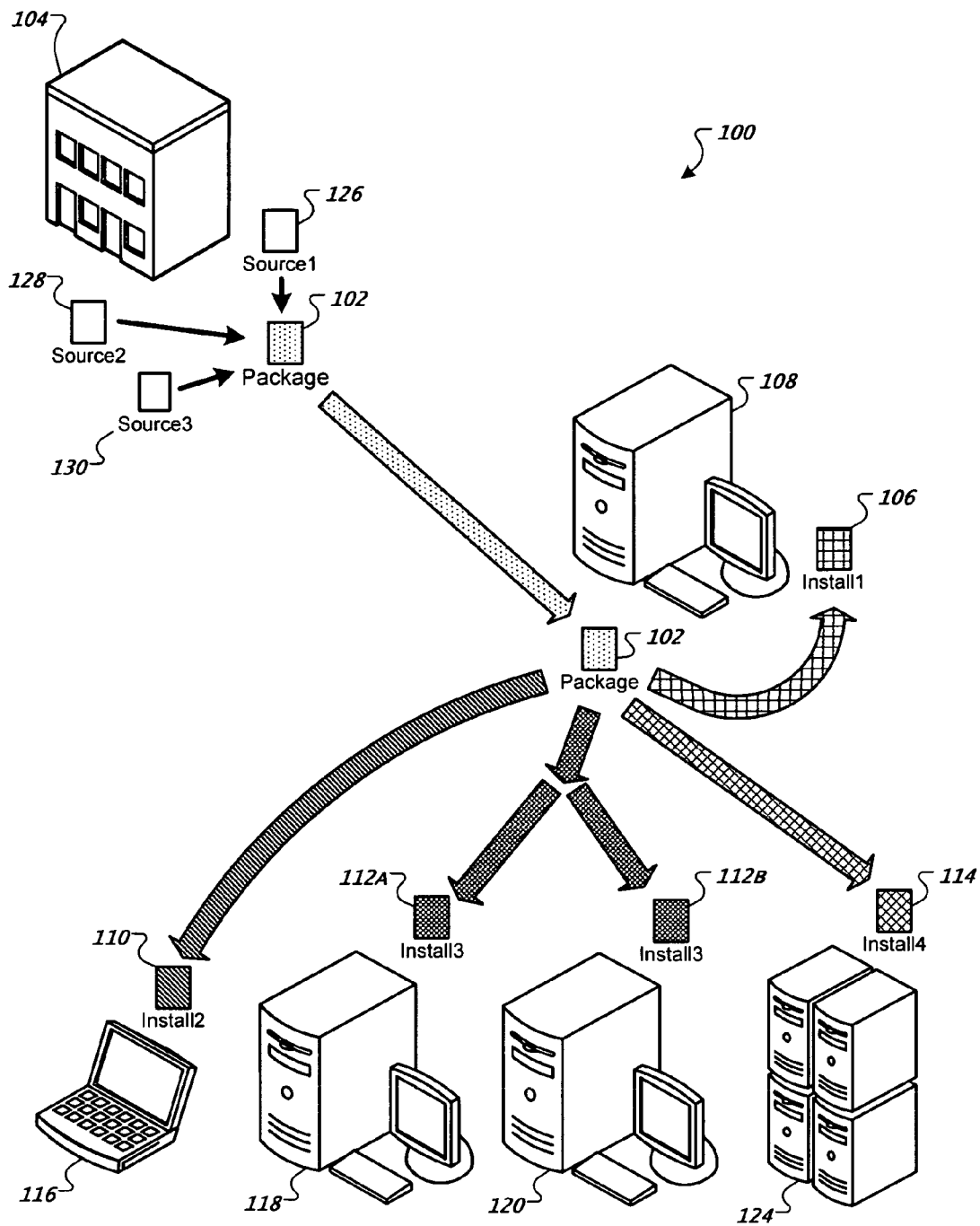
FIG. 1 is a block diagram showing an example system for software distribution and installation.

FIG. 1 is a block diagram showing an example system 100 for software distribution and installation. The system 100 can be used to install applications on various different platforms from a single source package. Such a system can simplify distribution by reducing the number of installation packages that need to be available for installing on various different computer platforms. Creation of application archives can also be made simpler by reducing the total amount of space and number of packages that need to be tracked and put into storage. Use of a cross-platform installation package can help mitigate the amount of work required to install an application to a new computer platform by reducing the portion of code that needs to be ported. As used herein, an "application" refers to a computer program that the user perceives as a distinct computer tool used for a defined purpose. An application may rely on a runtime library to operate; for example, an application can be a Flash® application that uses SWF and runs on a computer using a client-based runtime library that runs Flash® applications separately from a web browser, whether online or offline.

In the example system 100, a single cross-platform installation package 102 can be used to install an application on multiple, different platforms. A user, such as an end user or administrator, can obtain the cross-platform installation package 102 from a distributor 104 to create a native installation package 106 corresponding to a target computer 108. The native installation package 106 can be used to install the application on the target computer. In some cases, native installation packages 110, 112, 114 can be generated using the cross-platform installation package 102 for computers other than the generating computer 108; the native installation packages 110, 112, 114 can be created for computers 116, 118, 120, 124, some of which can have the same platform as the generating computer 108, and some of which can have different platform(s) than the generating computer 108.

The distributor 104 makes a cross-platform installation package 102 available. The distributor 104 can be a software developer, publisher, reseller, or other entity which distributes software. The distributor makes available a cross-platform installation package which includes source materials 126, 128, 130 that are used for installing the application. The source materials can be source code, machine code, libraries, data, documentation, configuration information, icons, or any other resource that can be used by an application or installation procedure. Portions of the source materials can be platform dependent or independent; for example, in a web browsing application, code for handling bookmarks may be the same across all computer platforms while code for handling copying and pasting may be platform-dependent. In another example, configuration files for different platforms can be included. Although the source materials can be targeted to multiple platforms, a single cross-platform package can be created which can be used to install the application on any of the supported platforms.

The user can obtain the cross-platform installation package 102 from the distributor 104. The cross-platform installation package 102 can be distributed on physical media, such as Compact Discs (CDs), Digital Versatile Discs (DVDs), floppy disks, etc., via networks, such as Local Area Networks (LANs), the Internet, peer to peer links, wireless networks, etc., by being preinstalled on computer equipment, such as hard drives, flash drives, portable music players, etc., or any other technique that can be used to deliver digital content. In addition, the cross-platform installation package 102 can be included in a data file for the application. Thus, the data file for an application can include an installable copy of the application itself.

When such a data file is to be opened, the data file can first be handled by enabling software separate from the application, such as the virtual machine, transcoder, and/or runtime library described further below. This enabling software checks whether the application has already been installed, and if not, installs the application using the techniques described herein. In either event (installation or confirmation of previous install), the application is then provided with access to the original data/installation file for further processing in accordance with the functions provided by the application.

A native installation package 106 can be created from the cross-platform installation package 102. In some implementations, the user can create the native installation package by double clicking on an icon representing the cross-platform installation package 102 to open it for transcoding. As used herein, the term "transcoding" refers to a process of converting a cross-platform installation package into a native installation package. A transcoding program can run on the user's computer and use the included source materials 126, 128, 130 to generate the native installation package 106 specific to the platform of the target computer 108. In some cases, a native installation package 110 can be generated for a different target computer 116 with a platform different than the platform of the generating computer 108. In such cases, the transcoder can be designed to generate native installation packages for multiple platforms. In some implementations, several, different transcoders can be used, where each transcoder generates a native installation package for a given platform. In some implementations, a transcoder can be run on multiple platforms by being written in a cross-platform language such as Java or Shockwave Flash (SWF).

The user can install the application using the native installation package 106 generated from the cross-platform installation package 102. The native installation package 106 uses the native operating system installer to install the application; this enables use of the installation procedures that are native to the platform. Maintenance performed on the target computer, e.g. setup, reinstallation, removal, etc., can be done using the utilities native to the OS. In some implementations, execution of the native installation package can be initiated automatically after generation of the native installation package. In other words, the same action that initiates creation of the native installation package, such as a double click on an icon, can also initiate the execution of the native installation package when generation is complete.

Users can create native installation packages for other computers. Native installation packages can be generated for computer platforms that are different than the platform used to create the native installation package. For example, a computer running a Windows® operating system (available from Microsoft Corporation) could generate a native installation package for a Mac OS® operating system (available from Apple Computer Inc.), or vice versa. The same cross-platform installation package can be used to create native installation packages for multiple, different computers. For example, an administrator can create native installation packages on a single computer running a Windows® operating system to install an application on a laptop running a Mac OS® operating system, multiple desktop PCs running a Windows® operating system, and a cluster of servers running a Linux® operating system (an open source operating system developed by Linus Torvalds et. al.). In some instances, a user can create multiple, different native installation packages to install an application on a single computer that is capable of running multiple operating systems, such as a Windows® operating system or Linux® operating system, by booting off different disk partitions or running virtualization software.

As an example, an administrator who uses a computer running a Windows® operating system can obtain from a software distributor a CD-ROM, which includes a cross-platform installation package for an image editing tool. If not already present, the administrator can install an appropriate transcoder from the CD-ROM to generate a native installation package corresponding to his or her computer. The administrator can choose to have the transcoder initiate installation using the native installation package once this package is finished generating, causing the image editing tool to be installed on the computer using the installer native to the Window® OS. As an alternative, the administrator can choose to have the transcoder only generate the native installation package, which can then be processed by the native installer at a later time, such as when a user clicks on a single icon representing the generated native installation package (i.e., the install file generated by the transcoder).

Continuing the above example, the administrator can evaluate the image editing application and can choose to deploy the application throughout the company. If needed, the administrator can install transcoders onto his or her computer via the Internet or from the CD-ROM as needed to generate native installation packages for a Mac OS® operating system and a Linux® operating system. In some implementations, a single transcoder can support generating native installation packages for multiple, different target computers. The administrator can use the transcoder(s) to generate native installation packages for a Mac OS® operating system and Linux® from the cross-platform installation package. Generation of a package for a Windows® operating system may not be needed since this was generated for the installation on the administrator's computer prior to evaluation, in this example. The administrator can then make the Mac OS® installation package and Windows® installation package available on a LAN for users in his or her organization. User A downloads the Mac OS® native installation package and installs on his or her laptop. Users B and C download the Windows® native installation package and install the application on their desktops. The administrator can also transfer the Linux® native installation package to the server cluster and install the application on each server.

Figure 2:
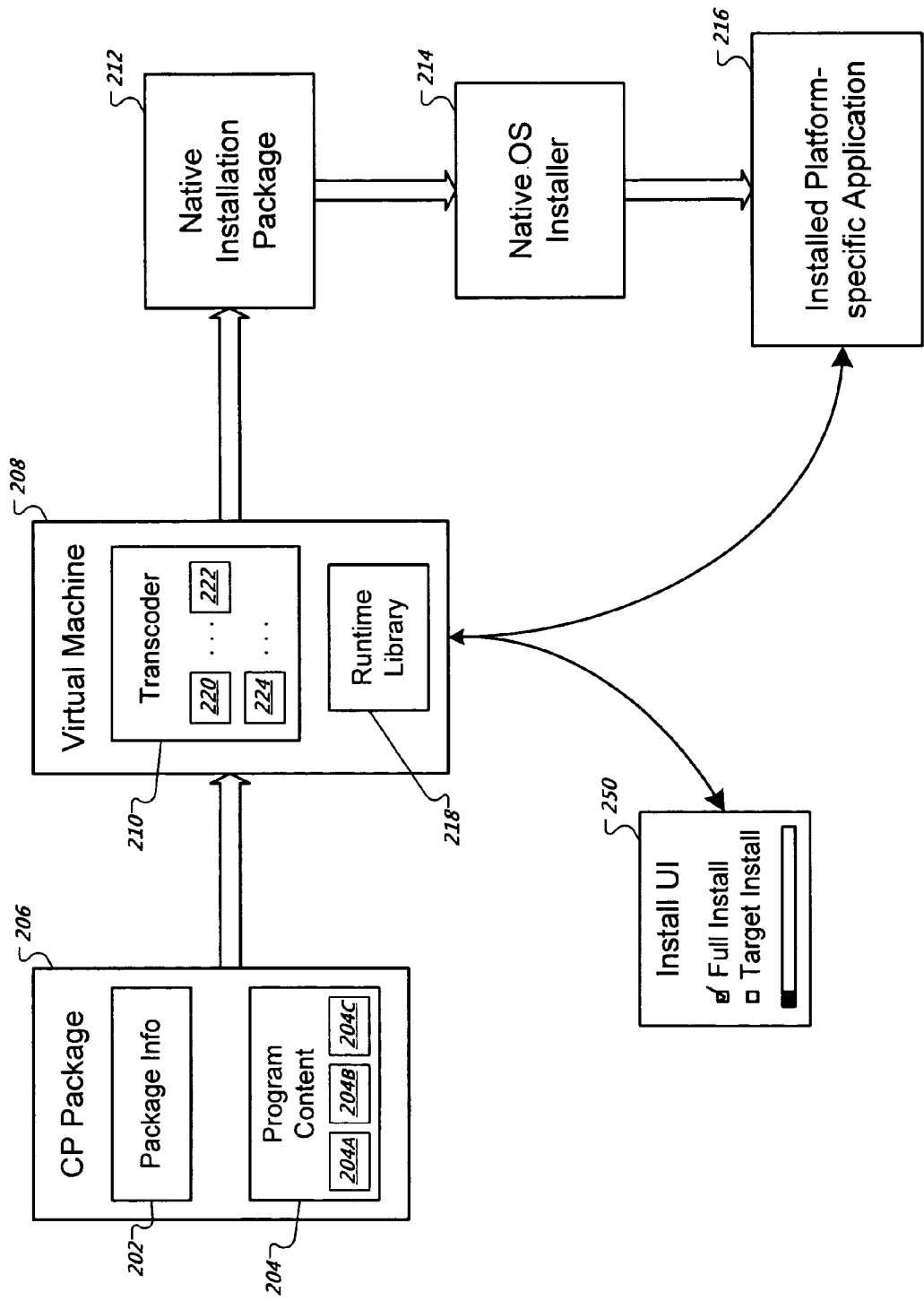
FIG. 2 is a block diagram showing an example cross-platform installation package being converted to a native installation package and installed on a target platform.

FIG. 2 is a block diagram showing an example cross-platform package being converted to a native installation package and installed on a target platform. A transcoder 210 can create a native installation package (e.g., a single install file on the target computer), which a native OS installer can use to install the application on a target computer.

A cross-platform package 206 can include package information 202 and program content 204. A virtual machine 208 (which can be located on the target computer or another computer) can include the transcoder 210, which creates a native installation package 212 using the package information 202 and the program content 204 from the cross-platform package 206. A native operating system installer 214 can use the native installation package 212 to install a platform specific application 216 on a target computer.

The package information 202 describes the content of the cross-platform package 206. The cross-platform package can include instructions related to generating native operating system installers. The package information 202 can include information useable in an installation sequence, which can be stored in eXtensible Markup Language (XML) or other platform independent format. For example, the cross-platform installation package 206 can be stored as a compressed and/or encrypted file (e.g., a Zip file), and the package information 202 can be stored in an XML file included within the compressed and encrypted file. This XML file can contain information used by the transcoder 210, such as the application name, the application version, publisher name, an icon for the application (e.g., in .png format), a default installation directory, file extensions registered by the application, and Multi-purpose Internet Mail Extensions (MIME) content types registered by the application. Moreover, this XML file can contain one or more references to the information used by the transcoder 210, rather than the actual data itself, in which case these reference(s) also constitute information useable in an installation sequence. In general, the package information 202 can include a description of all the items an installation sequence uses, but abstracted away from platform-specific notions.

The program content 204 in the cross-platform package 206 can include source code, object code, configuration files, icons, libraries, documentation, etc. In some implementations, some source material for creating the native installation package 212 can be pulled from a remote source over a network connection. In some implementations, some source material for creating the native installation package 212 can already be present on the target computer or in the transcoder 210. In some implementations, the cross-platform package 206 can include transcoders for multiple, different platforms so that the user can find all the required elements to begin installation already present, regardless of which type of platform is used for a target.

In general, the program content 204 can include first, second and third sets 204A, 204B, 204C of information. The first set 204A includes the information that is copied by the transcoder 210 directly from the cross-platform package 206 to the native package 212 without any modifications. For example, this program content can be interpreted code that relies on a runtime library 218 to operate, such as SWF. The second set 204B includes the information that is modified by the transcoder 210 during conversion from the cross-platform package 206 to the native package 212. For example, this program content can include an application icon stored in Portable Network Graphics (PNG) format, which can be translated into the Windows® Icon format (ICO) for a Windows® platform. The third set 204C includes any information that is specific to a first platform and thus need not be added to the native package 212 when generated for a second, different platform (although such information may be included in the package 212, and just not used on the second platform).

The transcoder 210 can be included with a virtual machine 208. The virtual machine 208 is a runtime environment that provides software services for processes or programs while a computer is running. The virtual machine 208 includes the runtime library 218, which is a collection of utility functions that support a program while it is running, often working with the OS to provide facilities. It should be appreciated that the runtime library 218 and the virtual machine 208 can be considered one and the same in some implementations. The virtual machine 208 can be client-based software that runs Flash® applications, supports vector and raster graphics, bidirectional streaming of audio and video and one or more scripting languages (e.g., ActionScript). Moreover, the virtual machine 208 can deeply integrate Flash® applications with the OS, providing services such as file system access, multiple windows, running in the background, etc. Inclusion of the transcoder 210 with the virtual machine 208 can be implemented by building the transcoder's functionality directly into the virtual machine 208 or by simply associating the transcoder 210 with the virtual machine 208, such that they are delivered as a package together.

Moreover, the transcoder 210 can be a stand alone program (e.g., a platform specific program in native machine code), interpreted and/or partially compiled code that relies on the runtime library 218 to operate (e.g., SWF code), or a combination of these. The transcoder 210 can include program content (e.g., a Flex script, Flash® file, etc.) that when compiled and/or interpreted creates code to provide functionality to the transcoder 210. For example, the transcoder 210 can include program content that provides a presentation layer 250 for the transcoder 210 during the installation process. This program content can be in the form of SWF containing code, video, images, etc. (e.g., SWF generated from another tool or language, such as Flex), or it can be in another form.

The program content can be compiled and/or interpreted using the runtime library 218 to create a SWF file that can access information from a to-be-installed application, such as the package information 202 in the cross-platform package 206. During installation of an application 216, the SWF file can run as a movie, providing an install user interface (UI) 250. This install UI can include user input controls to affect the installation process (e.g., full install to the current platform or target install to create a specified target native installation package), and the install UI can present ongoing install process updates (e.g., a progress bar generated from communications received by UI 250 from the OS installation mechanism). Moreover, this Flash® movie install UI 250 can run through the native OS installer 214 process for a full install and mask the user interface of the OS installer 214, while the transcoder 210 controls the installation through the native OS installer 214 to generate the final, OS integrated and installed platform-specific application 216.

Note that while the install UI 250 masks the native OS install UI, the look and feel of the new install UI 250 can be made to match that of a native OS installer UI. The UI 250 can dynamically present an appearance that matches the native OS installer UI of the target platform. Thus, the UI 250 can appear to be a Mac OS® install UI when the transcoder 210 generates the application 216 for a Mac® target, even while running on a Windows® computer.

A user can obtain and install the transcoder 210 and/or virtual machine 208 for installing a first application, then subsequently reuse the transcoder 210 and/or virtual machine 208 for installation and/or application support. The transcoder 210 and virtual machine 208 can be made available for multiple different platforms (e.g., different platform specific versions of the transcoder 210 and virtual machine 208 can be freely distributed, such as over a public network or by pre-installation on computer equipment prior to sale). If the transcoder 210 and/or virtual machine 208 are not already present on a given machine, they can be included with the cross-platform package 206 as well. In some implementations, the transcoder 210 can run natively on a generating computer without requiring a virtual machine. In some implementations, use of a virtual machine can increase portability of a transcoder by reducing the number of transcoders developed for generating native OS installation packages. In some implementations, the transcoder 210 can have the ability to generate multiple native installation packages for different target platforms.

Moreover, the transcoder 210 can be pre-installed and include a copy of the runtime library 218, and the transcoder 210 can add the runtime library 218 to the native installation package 212 so that the runtime library 218 is installed on the target computer along with the application 216. The runtime library 218 can be bound to the application 216 (i.e., a dedicated copy of the library 218, which only the application 216 can use), or the runtime library 218 can be simply bundled with the application 216 (i.e., the library 218 is installed along with the application 216, but is then available for other applications on the target computer).

The transcoder 210 can generate a native installation package 212 using the cross-platform package 206. The transcoder 210 can use the package information 202 and program content 204 included in the cross-platform package 206 to generate the native installation package 212. Some of the program content 206 can be platform specific, such as hardware drivers used for a specific peripheral device. In some implementations, the transcoder 210 can use preexisting components from the OS, such as Dynamic-Link Libraries (DLLs) or other installed components. In some implementations, the transcoder 210 can use components included with the virtual machine 208. The transcoder 210 can use multiple template executables 220, 222 and one or more template installation packages 224 to create the native installation package 212, as described in more detail below.

When generation of the native package 212 is complete, the transcoder 210, or the virtual machine 208, can initiate the native operating system installer 214. In some implementations, the native operating system installer 214 can be automatically invoked when generation is complete. In some implementations, the user can choose to manually execute the native installation package 212 at a later time or transfer the native installation package 212 to another computer.

The target computer's native operating system installer 214 can be used to install the application in a fashion that is natural for the platform. For example, computers running a Windows® operating system can use an .msi file to control application installations; a native operating system user interface can be used to perform maintenance functions on an application installed using an .msi file, such as reinstalling, adding components to, or removing the application.

After installation, the installed platform specific application 216 can be used. The conversion to the native installation package 212 and use of the native operating system installer 214 to perform application setup can result in the application 216 being tightly integrated with the OS, even when the new logic for the new application 216 is written in cross-platform interpreted code, such as Flash® code, and the new application 216 relies on the runtime library 218 to operate. For example, menu icons can be appropriately placed in program groups or on desktops, local settings can be used, and icons which are appropriate for the target system can be used.

In some cases, applications can be linked to other components. In some implementations, the transcoder 210 can construct the native installation package 212 in such a manner so that the native operating system installer 214 creates an application startup icon that initiates linked resources such as the runtime library 218 when the application 216 is started. In some implementations, the instance of the runtime library 218 can be dedicated to supporting the application 216. In some implementations, the application 216 can share an instance of the runtime library 218 with other applications.

The generation process creates the native installation package 212 in a format specific to the target platform, e.g., .msi file for a Windows® operating system. Since the installation process uses the platform's native installer, the installation process can proceed as though the cross-platform installation package was developed specifically for that target, i.e. installation and maintenance follows the native operating system installation procedure(s) the user is familiar with on his or her computer.

When installation is complete, the user can use the native installation package 212 and the native operating system to perform maintenance or to uninstall the application 216. For example, the user can maintain the application 216 (e.g., install a missing component or uninstall the application) using the procedure that is natural and appropriate to the platform, such as using the "Add-Remove Software" tool in a Windows® operating system.

Figure 3:
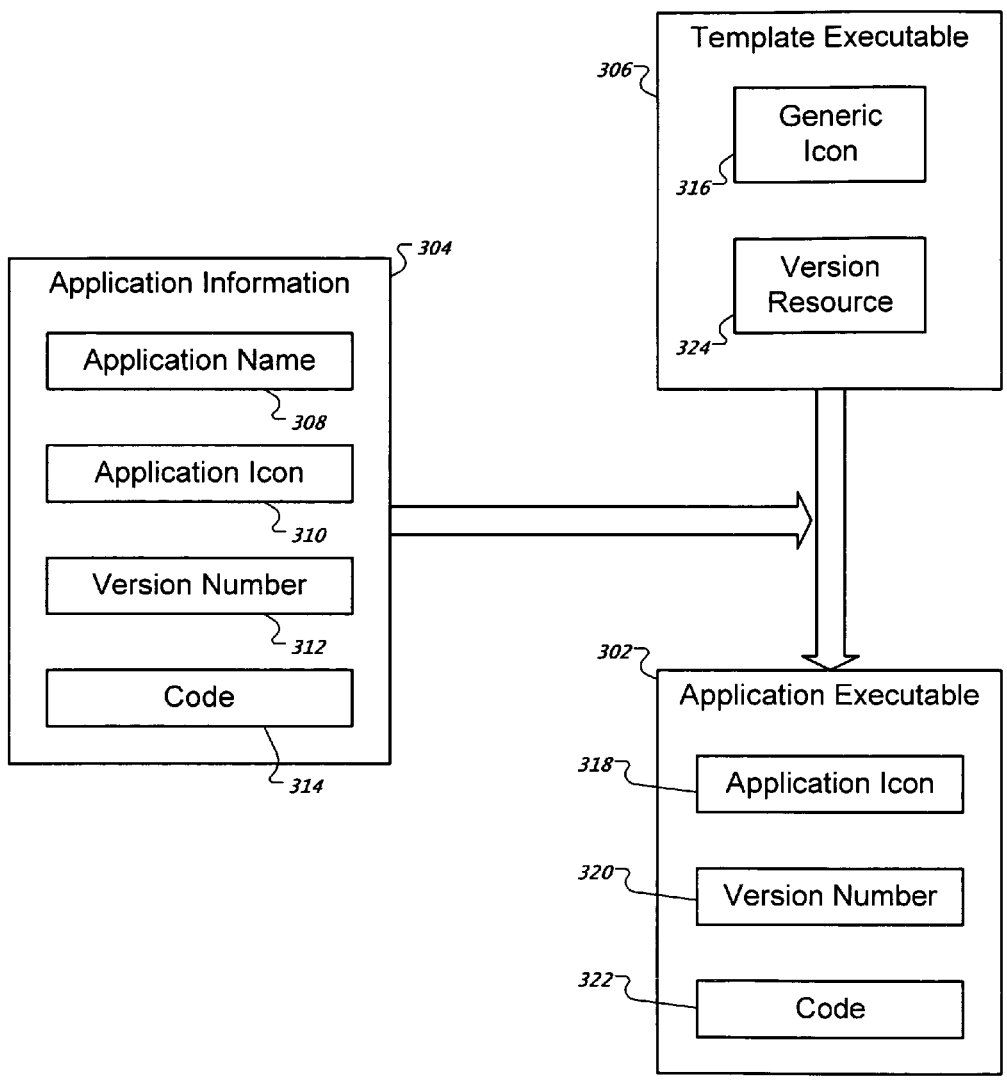
FIG. 3 is a block diagram showing an example template executable (e.g., for a WINDOWS® OS) being converted to an application specific executable.

FIG. 3 is a block diagram showing an example template executable 306 (e.g., for a WINDOWS® OS) being converted to an application specific executable 302. The native application executable 302 can be created and put into the native installation package such as described above in connection with FIGS. 1 and 2. Alternatively, the native application executable 302 can be created and placed into an install directory (along with possibly some associated files), and there be immediately ready to run. Thus, the template conversion described here in connection with FIG. 3 can be implemented as part of the conversion from the cross-platform package to the native package, or this template conversion can be done as part of a process of directly installing the application, without an intermediate native installation package.

Application information 304 can be supplied with a cross-platform package or by other means. This application information 304 can be combined with information from the platform-specific template executable 306 to generate the application executable 302. The application information 304 includes information specific to the application, such as code implementing algorithms, data, or documentation. The template executable 306 is specific to the target computer and contains machine code common to executables of that platform.

The template 306 is copied and renamed according to information included in the application information 304. The template 306 can include generic filler material, such as a generic icon 316, that is overwritten when creating the application executable 302. The template executable 306 can include other resources such as common code that can be used for performing common tasks or links to system libraries such as DLLs. In some implementations, the template executable 306 can include a version resource 324 to which version information about the application can be added when generating the application executable 302.

The application information 304 can include an application name 308, which is used as the name for the application executable 302. An application icon 310 can be included in the application information 304 and can be integrated with the template executable 302 when generating the application executable 302. For example, the application icon 310 can be an application specific graphic in PNG format that overwrites the generic icon 316 (e.g., after conversion to ICO format) to form the application icon 318 in the application executable 302. This application icon 318 is then used to start the application, such as by presenting the icon in the OS user interface for double clicking by a user. A version number 312 can also be provided with the application information 304 for further identification of the application executable 302, and the version resource 324 in the copied template executable 306 can be updated with the version number 312 to form the version number 320 in the application executable 302. Additionally, the application information 304 can include code 314, which can be cross-platform code, such as SWF and HyperText Markup Language (HTML), platform-specific code, such as machine code native to the target platform, or a combination of these. The code 314 can be in source, compiled (fully compiled or partially compiled) and/or interpreted form and can be inserted into the application executable 302 as code 322. For example, an SWF file that provides the logic and user interface for a new application can be embedded as a resource in the executable. A "resource", in this context, is a section of an executable file reserved for storing data of various types. Typically, an OS provides a programming interface, which can be used to manipulate the resources programmatically, and embedding SWF code as a resource can be done using an OS programming interface or by modifying the executable image directly (note that the specification for the executable format for any given platform describes how to structure the executable file to include these resources). Moreover, the application information 304 can include additional files, including both data and code, such as Portable Document Format (PDF) files and JavaScript files.

Thus, in general, a copy of the template executable 306 is made which becomes the application executable 302. Some items present in the template executable 306 are replaced in the application executable 302 with items used in whole or in part from the application information 304 provided. Some information or resources may need to be converted prior to use for populating the application executable 302. Some platforms may require icons to be converted to a particular graphics format different from that provided with the application information 304 (e.g., conversion from .png to .ico format). In some instances, the application name 308 provided with the application information 304 (or the install directory location) can be changed to follow the conventions of the target platform; in such cases, the application name 308 (and application executable location) can be converted to a suitable equivalent. In any event, the resulting application executable 302 is generated from the template 306, can run as native software on the target platform, and includes new functionality added to the executable 302 without recompiling the executable 302 from source code.

Figure 4:
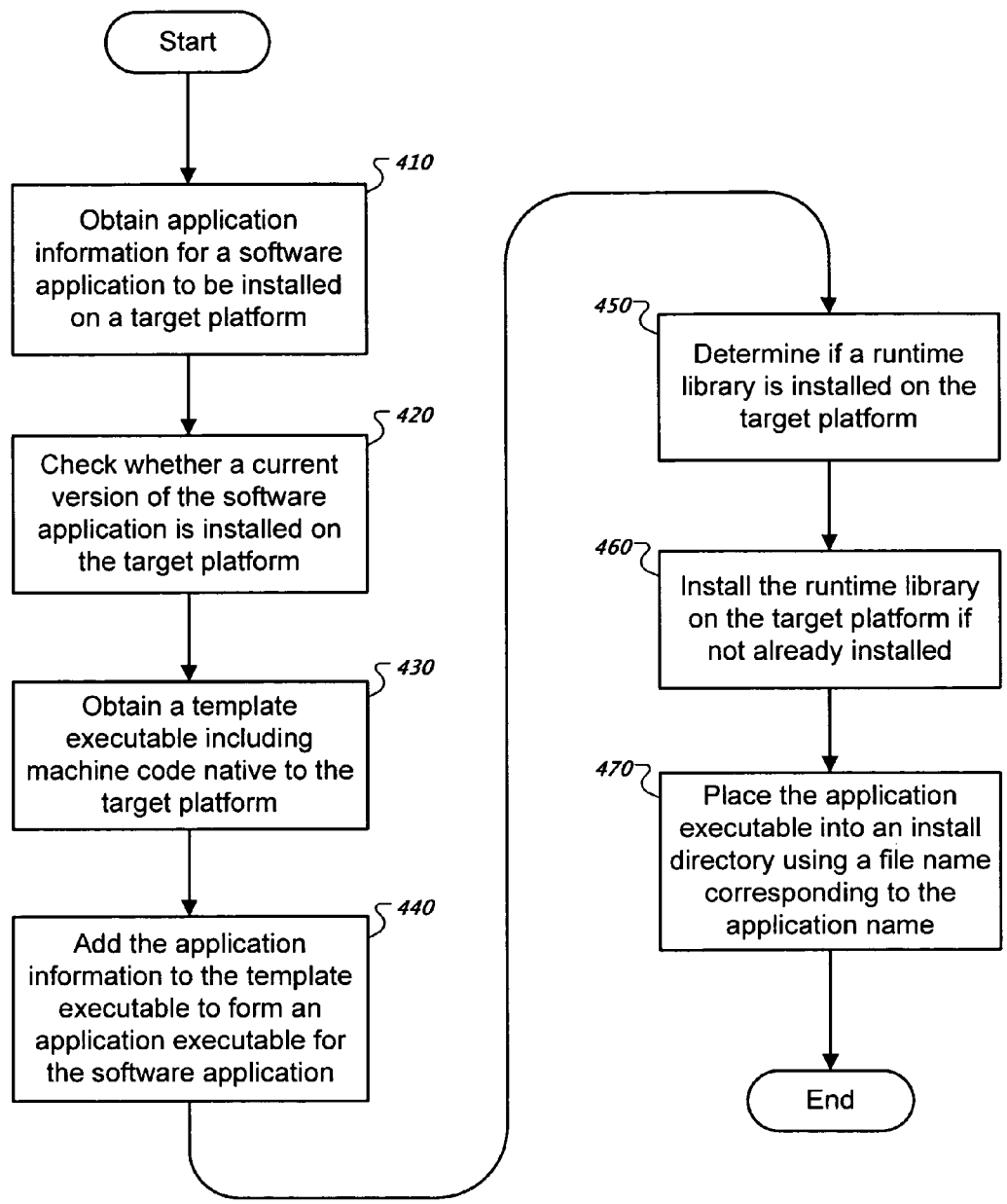
FIG. 4 is a flow chart showing an example method of installing software.

FIG. 4 is a flow chart showing an example method of installing software. The method includes obtaining precursor materials, checking for previously installed versions, and installing the software on a target computer. The target computer can be one of several, different platforms.

Application information can be obtained 410 for installing a software application on a target platform. The application information can include, for example, an application name, an application icon, version information, and application code. The application information can be used to form an application executable for installation on a target computer.

A user may attempt to reinstall the application unnecessarily; for example, the user may be unaware that the application has already been installed on the target computer. The method can include checking 420 the target computer to determine whether a current version of the software application is installed. In some implementations, if the software has already been installed, a user interface can prompt the user whether they wish to continue the installation (possibly giving the option of installing over the existing version or choosing a new location) or abort the installation process.

A template executable can be obtained 430 which includes machine code native to the target platform. This machine code enables the executable to run as a native application on the target platform. Application information can be added 440 to the template executable to form an application executable for the software application. The application executable then includes the native machine code from the template and new code (e.g., SWF code) added to the executable, which together form the application.

In some implementations, the method can include determining 450 if a runtime library is installed on the target platform. The runtime library can be installed 460 on the target platform if not already installed. The application executable can be placed 470 into an install directory using a file name corresponding to the application name. The application executable is then ready to run. Alternatively, the application executable can be added to a native installation package, which is in turn processed by the native OS installer.

Figure 5:
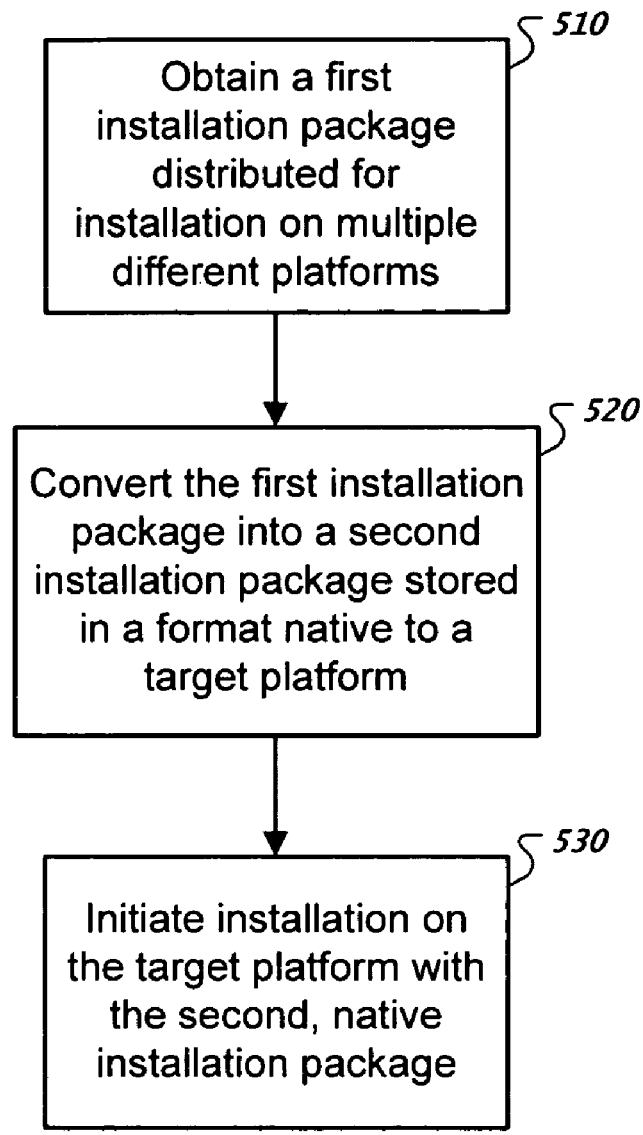
FIG. 5 is a flow chart showing another example method of installing software.

FIG. 5 is a flow chart showing another example method of installing software. The method includes converting materials in a cross-platform package into a native package that can be installed and executed on a target platform to create an instance of the application on a target computer.

A first installation package can be obtained 510 for installing software. The package can be pulled from a specific location (local or remote) or be received in response to another action, and the first package can be authenticated by checking a digital signature of the first package to make sure the package hasn't been modified since being signed. The first installation package is a cross-platform installation package distributed for installation on multiple different platforms. The first installation package can be used to install an application on multiple, different computer platforms. The first installation package can include interpreted and/or partially compiled code (e.g., scripts, SWF), compiled code (e.g., native machine code), or a combination of these.

The first installation package can be converted 520 into a second installation package stored in a format native to a target platform. For instance, the first installation package can be used to create a .msi file to install an application on a computer running a Windows® operating system. The contents of the first package can be read (e.g., including program content and an XML manifest), then the elements of the first package can be translated to corresponding elements in the second, native installation package. For example, the application name can be copied into the native installation package, all content files can be copied into the native installation package, instructions for installing the copied content files can be placed in the native installation package, component definitions can be created for executables and libraries to be installed, and the application icon is converted into the native icon format (if necessary) and placed in the native installation package.

Installation can be initiated 530 on the target platform with the second, native installation package. In some implementations, the program used to create the second, native installation package can cause it to run when its creation is complete, either locally or on a remote computer. In some implementations, the installation process can be initiated through the act of sending the second, native installation package to the target computer. The installation can then proceed at a later time, when the second, native installation package is processed by a native installer on the target platform.

The native installer can execute the second, native installation package to install an application, and this will typically involve more than just copying files into appropriate locations on the target machine. Native installers can perform additional actions, such as (1) enable/disable the installation of optional features, (2) register products, (3) activate or license products, (4) install Component Object Model (COM) components, (5) install system services, (6) register file extensions and MIME content types, (7) register instructions for uninstallation, and (8) create desktop shortcuts and start menu entries. Such additional actions can be implemented through the generated native installation package, thus achieving tight integration with the target computer's operating system.

In some implementations, the first installation package can be a single file that includes all the components needed to install the software on multiple different platforms. For example, a single installation package can be used to create various installation files for installing an application on a computer running a Windows® operating system, a computer running a Mac OS® operating system, and a computer running a Linux® operating system. In some implementations, the second installation package or resulting application can use a runtime library.

Figure 6:
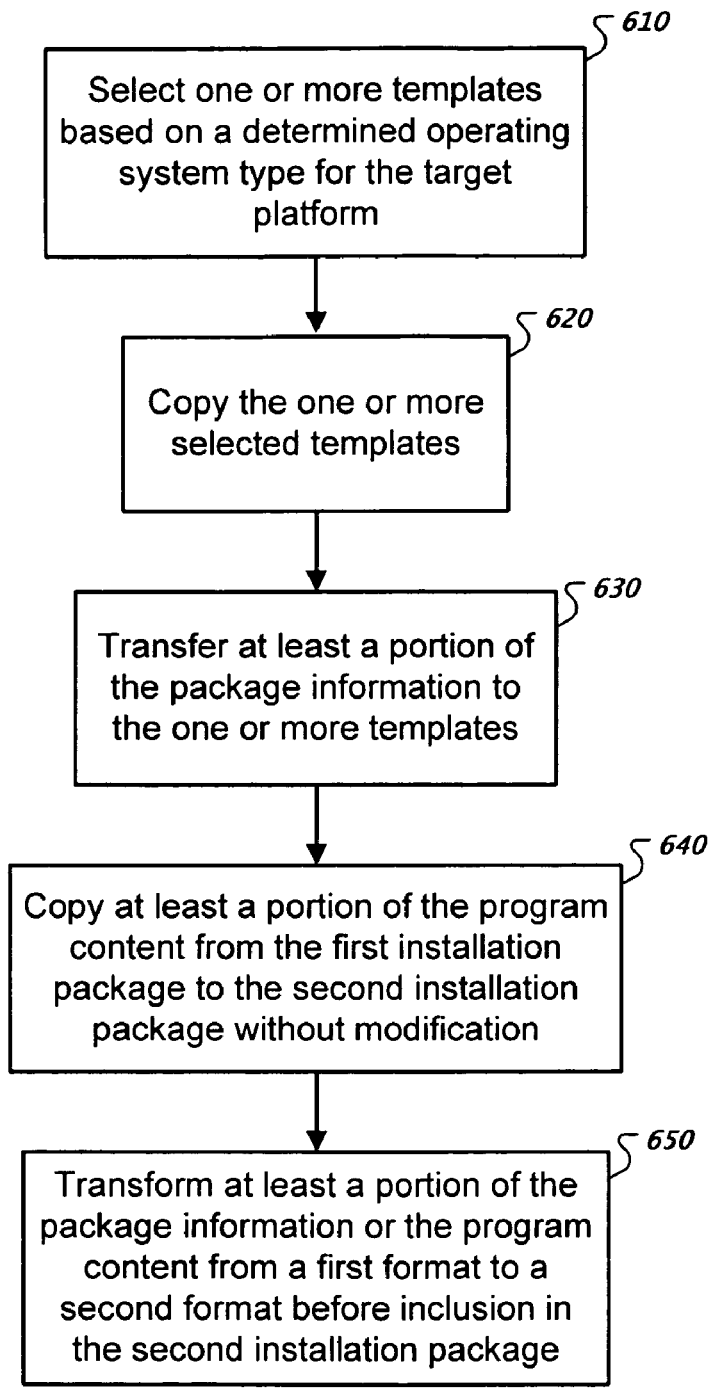
FIG. 6 is a flow chart showing an example method of converting a cross-platform installation package into a native installation package.

FIG. 6 is a flow chart showing an example method of converting a cross-platform installation package into a native installation package. One or more templates can be populated with information about the application obtained from the cross-platform installation package. One or more templates can be selected 610 based on a determined operating system type for the target platform. The operating system type of the target platform can be specified by a user or determined automatically (e.g., by checking the OS on the computer running the conversion process). The one or more templates can include a template executable and a template installation package. For example, if the target platform has a Windows® operating system, a template .msi file can be selected along with a template executable compiled for the Windows® system.

The one or more selected templates can be copied 620 to an appropriate location. In some implementations, the copy of the template(s) can be to memory prior to filling. In some implementations, a copy is made directly to non-volatile storage, such as a disk drive, and modified with information obtained from the cross-platform package. For example, a cross-platform installation package can be expanded in a newly created output directory, and a template native installation package and a template executable can be copied into the output directory for further processing.

At least a portion of the package information can be transferred 630 to the one or more templates. For example, for a Windows® platform, a first set of information from the package can be applied to a template executable (a .exe file) for the Windows® platform to create an application executable. Note that for a Mac OS® platform, the template executable can be copied (e.g., into the native installation package) but need not be modified, since the location of the copied executable can designate associated application components to use when running the executable. A second set of information from the package can be applied to a template installation package (a .msi file) for the Windows® platform to create the second installation package, in which the populated template executable is placed. This can be done using the Windows® Application Program Interface (API) to modify the .msi file.

At least a portion of the program content can be copied 640 from the first installation package to the second installation package without modification. For example, code (e.g., SWF code) can be copied to an executable without modification (aside from possibly being added to the executable). At least a portion of the package information or the program content can be transformed 650 from a first format to a second format before inclusion in the second installation package. For example, an application icon can be transformed from a portable network graphics format to a bit-mapped graphics format, and the template installation package copied to the new directory can be modified to include references to the files copied from the cross-platform installation package, and application attribute read from an XML manifest can be used to modify the native installation package appropriately (e.g., set the application name, etc.) In some implementations, additional content can come from other sources, such as a remote server accessed over a network.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:
1. A method of installing software, the method comprising:
  obtaining application information for a software application to be installed on a target platform, the application information including an application name, an application icon, version information, and application code;
  obtaining a template executable comprising machine code native to the target platform; and
  adding the application information to the template executable to form an application executable for the software application, wherein adding the application information comprises using an application programming interface provided by an operating system of the target platform to update an icon resource in the template executable with the application icon and to update a version resource in the template executable with the version information, wherein the method is implemented by a computing machine.

2. The method of claim 1, wherein obtaining the application information comprises opening an installation package received from a software distributor, the installation package comprising package information stored in a platform independent format.

3. The method of claim 1, wherein obtaining the application information comprises receiving a data file used by the software application, the method further comprising checking whether a current version of the software application is installed on the target platform before obtaining the template executable and adding the application information to the template executable.

4. The method of claim 1, wherein obtaining the template executable comprises selecting the template executable from among multiple, previously obtained template executables for different platforms.

5. The method of claim 1, wherein the adding comprises transforming the application icon from a first format to a second format before updating the icon resource in the template executable with the application icon.

6. The method of claim 1, further comprising placing the application executable into an install directory using a file name corresponding to the application name.

7. The method of claim 1, wherein the adding comprises embedding the application code as a resource in the application executable, the application code comprising interpreted code that relies on a runtime library on the target platform to operate.

8. The method of claim 7, wherein the interpreted code comprises bytecode that is compiled by the runtime library.

9. The method of claim 7, wherein obtaining the application information comprises opening an installation package received from a software distributor, the installation package comprising the runtime library, the method further comprising:
  determining if the runtime library is installed on the target platform; and
  installing the runtime library on the target platform if not already installed.

10. A non-transitory computer-readable medium tangibly embodying a computer program comprising instructions operable to cause data processing apparatus to perform operations comprising:
  obtaining application information for a software application to be installed on a target platform, the application information including an application name, an application icon, version information, and application code;
  obtaining a template executable comprising machine code native to the target platform; and
  adding the application information to the template executable to form an application executable for the software application, wherein adding the application information comprises using an application programming interface provided by an operating system of the target platform to update an icon resource in the template executable with the application icon and to update a version resource in the template executable with the version information.

11. The computer-readable medium of claim 10, wherein obtaining the application information comprises opening an installation package received from a software distributor, the installation package comprising package information stored in a platform independent format.

12. The computer-readable medium-of claim 10, wherein obtaining the application information comprises receiving a data file used by the software application, the operations further comprising checking whether a current version of the software application is installed on the target platform before obtaining the template executable and adding the application information to the template executable.

13. The computer-readable medium of claim 10, wherein obtaining the template executable comprises selecting the template executable from among multiple, previously obtained template executables for different platforms.

14. The computer-readable medium of claim 10, wherein the adding comprises transforming the application icon from a first format to a second format before updating the icon resource in the template executable with the application icon.

15. The computer-readable medium of claim 10, wherein the operations further comprise placing the application executable into an install directory using a file name corresponding to the application name.

16. The computer-readable medium of claim 10, wherein the adding comprises embedding the application code as a resource in the application executable, the application code comprising interpreted code that relies on a runtime library on the target platform to operate.

17. The computer-readable medium of claim 16, wherein the interpreted code comprises bytecode that is compiled by the runtime library.

18. The computer-readable medium of claim 16, wherein obtaining the application information comprises opening an installation package received from a software distributor, the installation package comprising the runtime library, the operations further comprising:
  determining if the runtime library is installed on the target platform; and
  installing the runtime library on the target platform if not already installed.

19. A system comprising:
  a user interface device;
  a computer platform including an operating system and a virtual machine, the virtual machine configured to create a virtualized environment between the computer platform and a software application programmed to operate on the virtual machine; and
  one or more computers operable to obtain application information for the software application to be installed on the computer platform, obtain a template executable comprising machine code native to the computer platform, and add the application information to the template executable to form an application executable on the computer platform, wherein to add the application information comprises using an application programming interface provided by an operating system of the target platform to update an icon resource in the template executable with the application icon and to update a version resource in the template executable with the version information;
  wherein the application information includes an application name, an application icon, version information, and application code.

20. The system of claim 19, the one or more computers operable to open an installation package received from a software distributor, the installation package comprising package information stored in a platform independent format.

21. The system of claim 19, the one or more computers operable to receive a data file used by the software application and to check whether a current version of the software application is installed on the target platform before obtaining the template executable and adding the application information to the template executable.

22. The system of claim 19, the one or more computers operable to select the template executable from among multiple, previously obtained template executables for different platforms.

23. The system of claim 19, the one or more computers operable to transform the application icon from a first format to a second format before updating the icon resource in the template executable with the application icon.

24. The system of claim 19, the one or more computers operable to place the application executable into an install directory using a file name corresponding to the application name.

25. The system of claim 19, the one or more computers operable to embed the application code as a resource in the application executable, the application code comprising interpreted code that relies on a runtime library on the target platform to operate.

26. The system of claim 25, wherein the interpreted code comprises bytecode that is compiled by the runtime library.

27. The system of claim 25, the one or more computers operable to open an installation package received from a software distributor; the installation package comprising the runtime library; and the one or more computers operable to determine if the runtime library is installed on the target platform, and install the runtime library on the target platform if not already installed.

* * * * *